B. A. ALPERIN.
TIRE LOCK FOR AUTOMOBILES.
APPLICATION FILED AUG. 4, 1911.
1,042,377.
Patented Oct. 29, 1912.
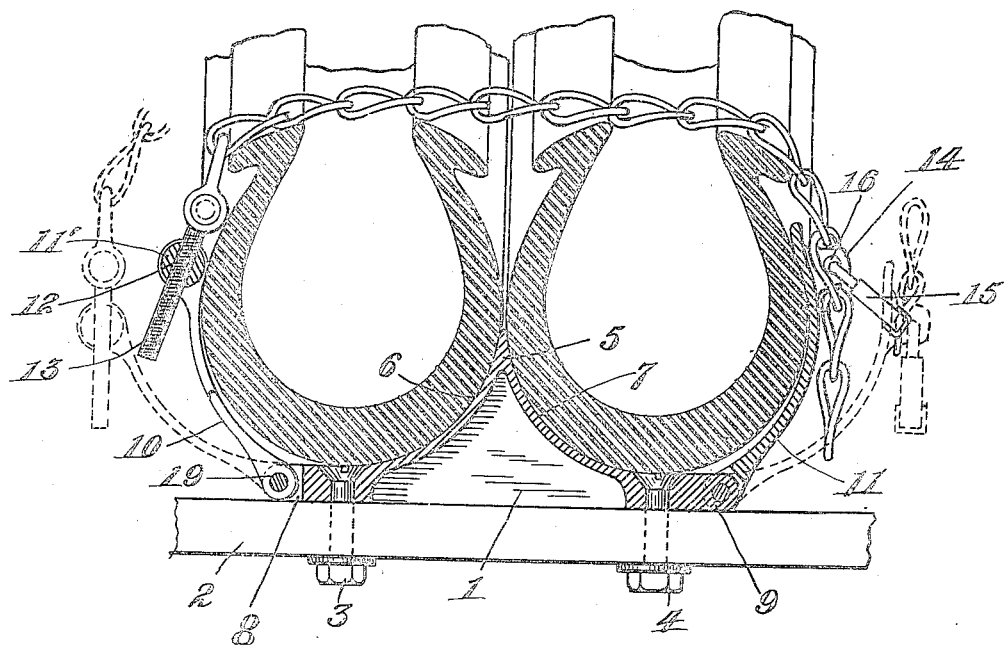
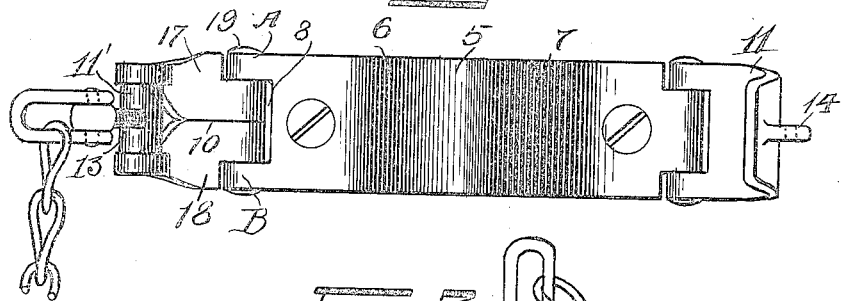
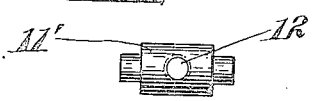 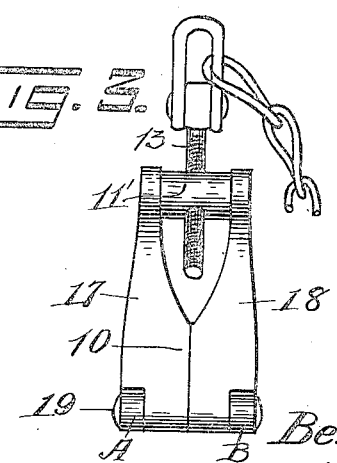
Witnesses:
Inventor:
Bernard A. Alperin,
By his Attorney

UNITED STATES PATENT OFFICE.

BERNARD A. ALPERIN, OF NEW YORK, N. Y.

TIRE-LOCK FOR AUTOMOBILES.

1,042,377.

Specification of Letters Patent. Patented Oct. 29, 1912.

Application filed August 4, 1911. Serial No. 642,231.

*To all whom it may concern:*

Be it known that I, BERNARD A. ALPERIN, a citizen of the United States, residing in New York, in the county of New York and State of New York, have invented certain new and useful Improvements in Tire-Locks for Automobiles, of which the following is a specification.

My present invention relates to an improvement in an all metallic tire locking support, which is adjustable to any standard size of tires to hold the same and is intended to be attached to the running board of an automobile.

A further advantage is that by my lock I am enabled to hold either one or two tires therein at will.

In the accompanying drawings Figure 1 is a side elevation of my device with a fragmentary portion of the tires in section. Fig. 2 is a plan view of the device with the tires removed. Fig. 3 is an end elevation. Fig. 4 is a view of the shackle trunnion.

In Fig. 1 the device is shown composed of a base piece 1 mounted upon a running board 2, said base piece being held in place by screws or bolts 3 and 4. The base piece 1 is shown as having a raised portion 5 at its center, having substantially curved faces 6 and 7 on opposite sides of said raised portion and adapted to fit the average contour of the external or tread portion on automobile tires. On the opposing ends 8 and 9 of the base piece are pivotally attached two outwardly curved swinging members 10 and 11. The pivoted member 10 has at its upper end a trunnion 11' as shown in Fig. 4, said trunnion having a hole 12 with a threaded bore for the purpose of receiving therein a threaded adjustable shackle member 13. The threaded shackle member carries on one end a chain of sufficient length to reach across the upper portion of the tires and said chain being made of the open link type, is thereby enabled to be engaged at any one of the links with a lug 14 which is fixed on the opposite swinging member 11, thus permitting the chain to be adjusted to rigidly hold the tires. A padlock 15 is then locked in the hole 16 which is arranged in the lug 14, thereby locking the chain against removal. It will be noted that this arrangement permits the user to take up the chain so that the tires are rigidly held in the curved seats formed by the base member and the two swinging members 10 and 11.

In my present construction I preferably employ a solid shackle trunnion 11', Fig. 4, and for that reason the swinging member 10 is composed of two parts 17 and 18, the members being right and left handed and being held together when assembled by means of the pin 19 and the trunnion member 11'.

The reason for the split construction of the swinging member 10 is that it permits the trunnion 11' to be pivotally mounted in the upper end of the said member 10, the lower end of the two members comprising the member 10 being placed between the extensions A and B, Fig. 2, of the base member 1. The pin 19 is then inserted in the extensions A and B of the base member passing through the lower portion of the two members forming the member 10, the said pin 19 being then headed over as shown in the drawing, thereby holding the two split members as one and doing away with the necessity, in manufacturing, of riveting over the trunnion member 11'. The two members constituting swinging member 10 are then held as one member by means of the pin 19 at the lower end and by means of the trunnion member 11' at the upper end thereof.

The trunnion member is arranged to swing or oscillate in the bearings formed by the two members 17 and 18, thereby more effectually permitting the shackle member 13 to accommodate itself to the contour of the tire to be held.

Having thus described my invention, I claim:

A tire lock comprising a base member adapted to be attached to the running board of a car, a link pivoted at one end of the base and provided with means for engaging a locking member, a pair of apertured lugs projecting up at the other end of the base, a pin member mounted in the apertured lugs, a pair of complemental arms pivotally mounted at one end and located between said lugs on the pin, said arms having their other ends apertured and spaced apart, a trunnion member comprising a body and reduced ends on the body projecting into said spaced ends of the arms respectively, the body of the trunnion having a transverse threaded bore, a bolt member fitting in said bore and adjustable therein, and a securing member carried by said bolt to engage said link member at the other end of the base.

BERNARD A. ALPERIN.

Witnesses:
JOHN MORRIS,
FRED. J. DOLE.